United States Patent [19]

Shealy

[11] 4,037,696
[45] July 26, 1977

[54] DYNAMIC TOOTH CLUTCH

[75] Inventor: Noah Alvin Shealy, Niles, Mich.

[73] Assignee: Clark Equipment Company, Buchanan, Mich.

[21] Appl. No.: 684,326

[22] Filed: May 7, 1976

[51] Int. Cl.$^2$ .............................................. F16D 11/00
[52] U.S. Cl. .................................... 192/48.5; 192/52; 192/55; 192/67 A
[58] Field of Search .............. 192/48.5, 52, 55, 67 A, 192/53 R, 53 A, 53 E, 53 F

[56] References Cited

U.S. PATENT DOCUMENTS

| 992,938 | 5/1911 | Brophy | 192/55 |
|---|---|---|---|
| 1,777,012 | 9/1930 | Murray | 192/53 A |
| 1,888,884 | 11/1932 | Omer | 74/713 |
| 2,304,914 | 12/1942 | Hibbett | 74/316 |
| 2,638,794 | 5/1953 | Knoblock | 74/650 |
| 2,803,149 | 8/1957 | Pringle | 74/710.5 |
| 2,876,658 | 3/1959 | McColl | 74/710.5 |
| 3,146,842 | 9/1964 | Nelson | 180/22 |
| 3,498,154 | 3/1970 | Mueller-Berner | 74/710.5 |
| 3,503,280 | 3/1970 | Bopp | 74/695 |

Primary Examiner—Robert G. Nilson
Attorney, Agent, or Firm—Ernst H. Ruf

[57] ABSTRACT

A dynamic tooth clutch, interposed between two rotating members for coupling same, includes a first collar slidably mounted on one of the members and has a plurality of equally angularly spaced axially extending radial first teeth. A second collar is fixed to the other member and has a plurality of equally angularly spaced axially extending radial second teeth that are adapted to intermesh with the first teeth and are so angularly spaced that, when the first and second teeth are centered relative to one another, there is a first predetermined amount of bidirectional angular rotational movement therebetween before there is abutment of adjacent tooth side surfaces. A cam ring coacts with the second collar, with the cam ring being capable of a predetermined amount of bidirectional rotational movement relative to the second collar. The cam ring, which is preloaded and self-centered relative to the second collar, has a plurality of teeth, with the cam ring teeth, having a greater angular extent than either the first or second teeth, being adapted to intermesh with the first teeth, with the axial clearance between the outer axial end faces of the first and second teeth being less than the axial clearance between the outer axial end faces of the first teeth and the cam ring teeth. The outer axial end faces of the second teeth are provided with chamfer surfaces so that upon the abutment of the interfering portions the adjacent side faces of the first and second teeth, the chamfer surfaces cause a slight axial outward movement of the first teeth thereby disrupting the axial outer end face abutment between the first teeth and the cam ring teeth so as to prevent corner hang-up.

21 Claims, 5 Drawing Figures

DYNAMIC TOOTH CLUTCH

CROSS-REFERENCE TO RELATED APPLICATION

Co-pending application Ser. No. 561,520 filed Mar. 24, 1975 of common assignee herewith, now patent No. 3,973,450, is incorporated herein by reference.

BACKGROUND OF THE INVENTION

1. Field Of The Invention

The present invention relates to an improved dynamic tooth clutch interposed between a rotating first member, operating at a first speed, and a rotating second member operating at a second speed. This invention may be utilized, for example, as a differential lock structure in a differential mechanism. The dynamic tooth clutch, by having one of its toothed portions attached to an axle shaft and the other of its toothed portions attached to the differential case, by utilizing the improved cam ring of this invention together with the improved tooth structure, prevents corner hang-up.

2. Description Of The Prior Art

The prior art is replete with locking differential structures, examples thereof being shown in U.S. Pat. No. 1,888,884 to Omer et al, U.S. Pat. No. 2,304,914 to Hibbett, U.S. Pat. No. 2,803,149 to Pringle, U.S. Pat. No. 2,876,658 to McColl, and U.S. Pat. No. 3,498,154 to Mueller-Berner, with many of these structures utilizing jaw-type or toothed-type clutches. While these prior art structures tend to perform quite satisfactorily, a problem has remained in that the use of tooth-type clutches generally require that the engaging and disengaging sequences are preferably performed while the vehicle is at rest since the lack of synchronizer mechanisms causes clashing during dynamic conditions. In addition, if there is but partial axial engagement between the opposing clutch teeth, extremely high tooth shock loadings as well as possible tooth shear can result. Such partial engagement between the clutch teeth can, of course, readily result since there may be a speed differential of up to several hundred r.p.m. betweeen the axle shaft and the differential case, for example.

Co-pending application Ser. No. 561,520, filed Mar. 24, 1975, now U.S. patent No. 3,973,450, discloses therein a dynamic tooth clutch which solves many of the previously-noted problems in that it utilizes a cam ring that is capable of a predetermined amount of bidirectional angular rotational movement relative to one of the clutch halves, with this angular displacement allowing full centered intermeshing of the main torque-transmitting teeth before there is abutment and subsequent torque transfer between either of the side surfaces of one of the sets of teeth with the adjacent side surfaces of the other set of teeth.

The dynamic tooth clutch disclosed in said co-pending Application is interposed between two rotating members for coupling same and includes a first collar slidably mounted on one of the members, with this first collar having a plurality of equally angularly spaced axially extending radial first inner and outer teeth. A second collar is fixed to the other member and has a plurality of equally angularly spaced axially extending radial second outer teeth that are designed to intermesh with the first outer teeth and are so angularly spaced that when the first and second outer teeth are centered relative to one another there can be a first predetermined amount of bidirectional angular rotational movement therebetween before there is abutment of adjacent tooth side surfaces. A cam ring coacts with the second collar, with the cam ring being capable of a predetermined amount of bidirectional angular rotational movement relative to the second collar. The cam ring, which is preloaded and self-centered relative to the second collar, has a plurality of second inner teeth that are angularly aligned with the second outer teeth in the self-centered cam position, with the combined tooth depth of the first and second inner teeth being greater than the combined tooth depth of the first and second outer teeth, thus permitting axial end abutment of only the inner teeth in the absence of intermeshing. The force for displacing the first collar toward the second collar is less than the centering force on the cam ring thus permitting direct meshing of the first and second inner teeth but only complete centered axial meshing of the first and second outer teeth prior to the angular displacement of the cam ring relative to the second collar, thereby allowing full axial intermeshing of the first and second outer teeth before there is abutment and subsequent torque transfer between the outer teeth.

While the invention disclosed in said co-pending Application is effective for carrying out the objectives thereof, a considerable amount of further investigation has been carried out related thereto, both for simplifying of the structure itself and for improving the operation thereof.

In this last connection, it was noted in the further development of the collar members that the intersections of the tooth axial end faces and the tooth side surfaces, i.e., the corner intersections, of the first and second inner teeth, will on occasion hang-up. Thus, rather than frictionally sliding relative to one another, the opposing inner teeth hang-up on a corner, with this hang-up causing the angular translation of the cam ring. However, since there is no intermeshing of either the opposing inner and/or outer teeth, the cam ring will be angularly displaced but after a limited (5°) movement its external splines will encounter the internal splines on the second collar, with this encounter producing spline breakage and subsequent serious damage to the clutch structure. Basically, the structure of said co-pending Application has no mechanism for alleviating this corner hang-up problem.

One primary object of the present invention is to provide a dynamic tooth clutch having means for solving the previously-described corner hang-up problem. A further primary object of the present invention is to provide for complete axial engagement of the collar teeth before there is abutment and subsequent torque transfer between the adjacent side surfaces of the collar teeth. In addition, in a continued effort to still further improve upon the above-described dynamic tooth clutch, particularly in an effort to find other variations thereof relative to increasing the amount of angular rotational movement of the opposed collars relative to one another before there is actual tooth engagement, still further variations have been made in the cam ring structure which are particularly suitable for use in the dynamic tooth clutch to improve the operation thereof.

SUMMARY OF THE INVENTION

The improved dynamic tooth clutch structure of this invention solves the previously-noted corner hang-up operational problems in that it utilizes first and second opposed teeth, with the first teeth also being capable of meshing with opposed teeth on a cam ring. The axial clearance between the outer axial end faces of the first and second teeth is less than the axial clearance between the outer axial end faces of the first teeth and the cam ring teeth, so that the tooth axial end surfaces of the first and second teeth can axially abut whilst there is still axial clearance between the tooth axial end faces of the first teeth and the axial end faces of the cam ring teeth. Each second tooth is provided with cam or chamfer surfaces at the axial between its outer axial end face and its tooth side faces, so that if the outer axial end faces of the first teeth and the cam ring teeth abut, at a location angularly spaced from the end faces of the second teeth, upon abutment of the adjacent side faces of the first and second teeth, the chamfer surfaces cause a slight axial outward movement of the first teeth thereby disrupting the axial outer end face abutment between the first teeth and the cam ring teeth.

In summary, the improved tooth clutch of this invention is interposed between rotating first and second members, operating at different speeds, with this tooth clutch basically utilizing a pair of opposed annular members each of which has a series of equally angularly spaced axially extending teeth thereon. The teeth of these members are adapted to intermesh with clearance, so that when the teeth are in mesh, limited relative rotation can take place between these members, with the radial extent of the teeth of one of these members being greater than that of the teeth of the other member.

A cam ring is concentric with the other member and there are complementary retaining and control means on the cam ring and the other member such that the cam ring can rotate relative to the other member by a predetermined angular amount in either direction from a position in which it is centered relative to the other member. This control means also includes yieldable means for biasing the cam ring toward its centered position.

The cam ring has a series of axially extending teeth that are adapted to intermesh with clearance with the teeth of the one member, so that when the teeth of the one member are in mesh with the cam ring teeth, limited relative rotation can take place between the one member and the cam ring. The axial clearance between the tooth outer axial end faces of the pair of opposed annular members is less than the axial clearance between the outer axial end faces of the teeth of the one member and the outer axial end faces of the cam ring teeth, so that the tooth axial end faces of the annular members can abut whilst there is still axial clearance between the tooth axial end faces of the one member and the tooth axial end faces of the cam ring teeth.

Means are provided for effecting relative axial displacement between the one member on one hand and the other member and the cam ring on the other hand to effect meshing engagement between the teeth of the annular members and between the teeth of the one member and the cam ring teeth.

In contrast to the structure in my co-pending Application, wherein the first and second predetermined amounts of bidirectional angular movement between the teeth of the pair of opposed annular members and between the other of the members and the cam ring, respectively, is limited to 5°, the predetermined amount of angular rotation of the cam ring is up to 19° in either direction and the limited relative rotation between the teeth of the opposed annular members is limited to substantially 25° in either direction. A fluid pressure actuator, working in conjunction with a yoke member, can be used for axially translating one of the annular members into engagement with the other member.

Other features and advantages of this improved dynamic tooth clutch will become more readily understood by persons skilled in the art when following the detailed description in conjunction with the several drawings.

DESCRIPTION OF THE PREFERRED EMBODIMENT

Figure 1:
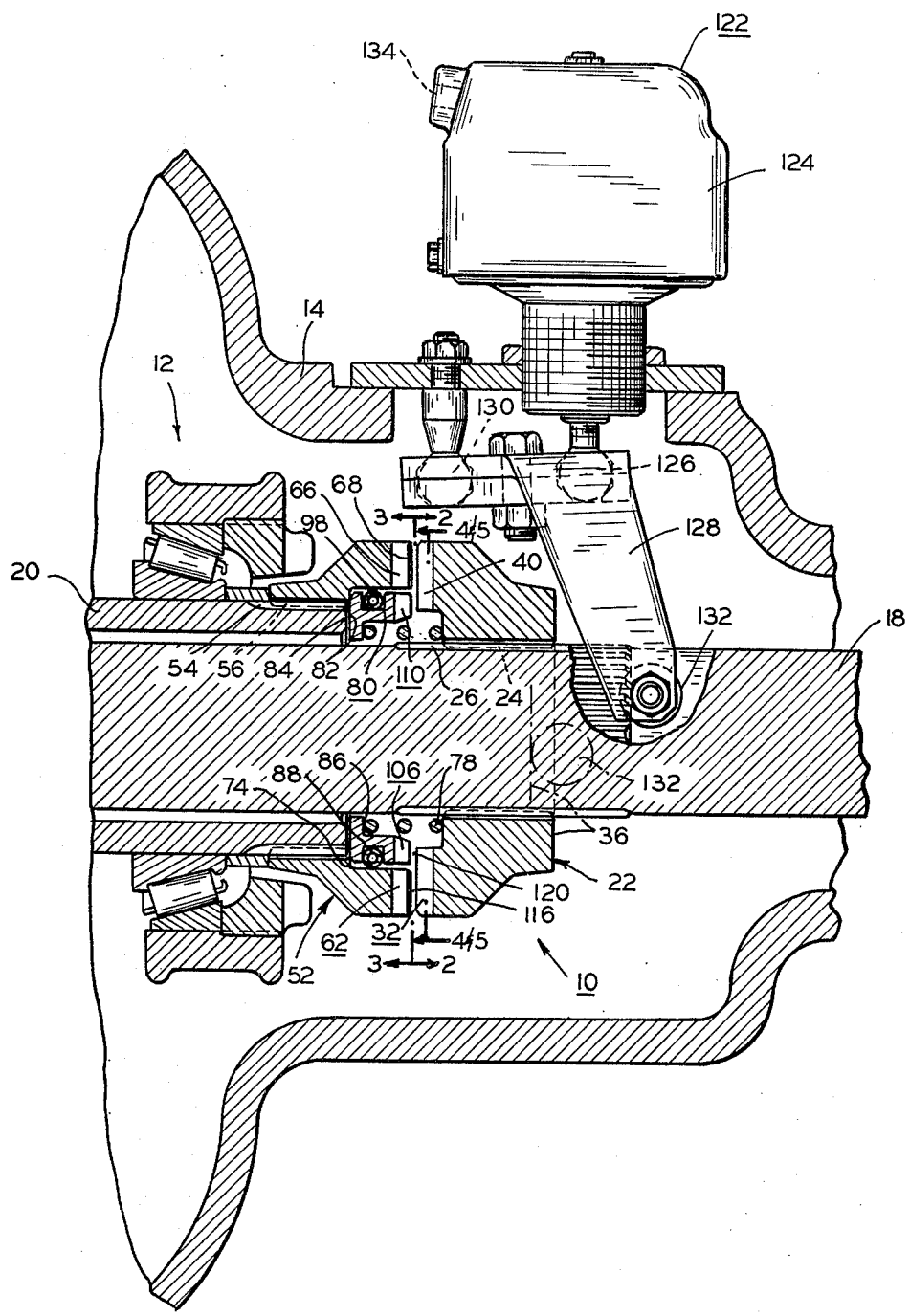
FIG. 1 is a sectional view of only a portion of an axle housing adapted to contain a differential mechanism (only a portion of which is shown) that utilizes the improved dynamic tooth clutch of this invention.

Referring now to the drawings, particularly FIG. 1, the improved dynamic tooth clutch of this invention, which is generally designated by the numeral 10, can by utilized, for example, as a differential lock structure in a differential mechanism 12, of which only a portion is shown. For further details thereof, reference should be had to copending patent application Ser. No. 561,520 filed Mar. 24, 1975, now U.S. Pat. No. 3,973,450, by the common assignee. Differential mechanism 12, which is of well-known construction, includes a differential case (only a portion of which is shown) and carrier (not shown) that contain the various components of the differential and provide openings for an input shaft (not shown) and a pair of co-axial drive axles or axle shafts 18 (only one of which is shown).

In the normal operation of differential 12, which is well known, when axle shafts 18 are operating at the same rotative speed, there is no relative rotation between the differential case and the side gears, and, therefore, no relative rotation between the differential case and axle shafts 18. However, if one of axle shafts 18 is permitted to turn more freely than the other, relative motion between its respective side gear and the differential case must occur so now the relative rotational speed between the differential case and the drive axle 18 will vary.

If it is desired, for example, to achieve maximum traction, a known way to achieve maximum traction is to lock the differential in the manner so that the differential case rotates in unison with one of the drive axles. This locking action, of course, stops the otherwise independent rotation of the normal planetary pinion gears, thereby locking the differential as is well known in the art.

The differential lock that is utilized in differential mechanism 12 may take the form of improved dynamic tooth clutch 10 which surrounds a portion of axle shaft 18, extending from an axle housing 14 (partially shown), and an outer portion 20 of the differential case and is utilized to couple the differential case and axle shaft 18 for conjoint rotation.

Figure 2:
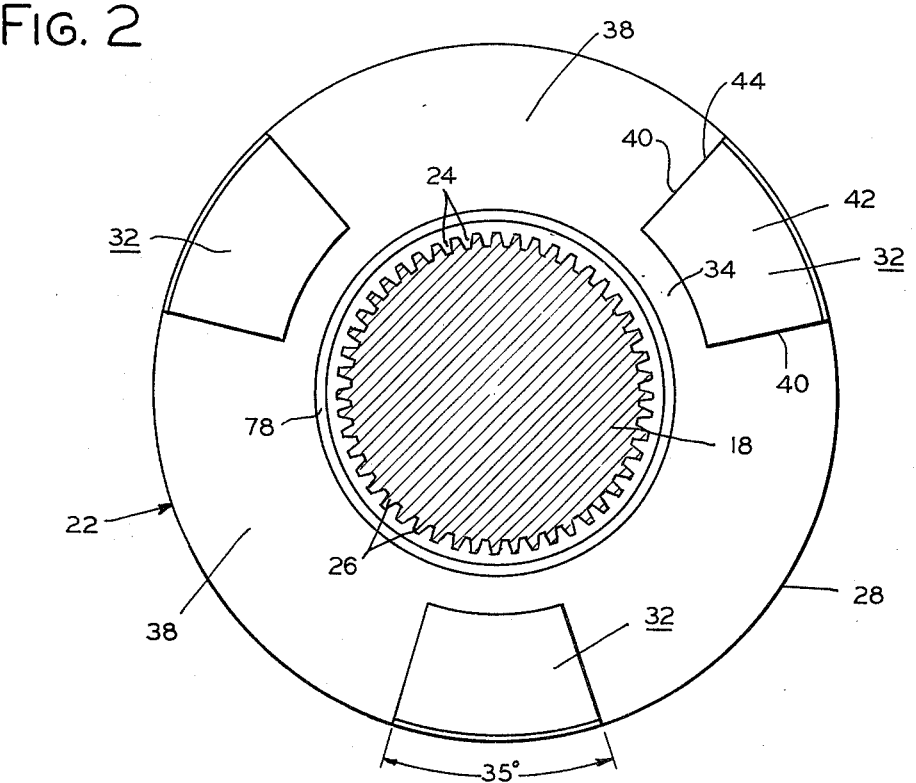
FIG. 2 is a simplified enlarged sectional view taken along line 2—2 of FIG. 1 and shows the driving-half portion of the clutch.

As best seen in FIGS. 1 and 2, dynamic tooth clutch 10 includes a shaft or driven-side collar 22 which is internally splined, as at 24, to splined portion 26 of axle shaft 18, so that collar 22 rotates with axle shaft 18 but is also capable of sliding axial movement with reference thereto. The generally flat front side surface 28 of collar 22 is provided with a plurality of equally spaced axially-extending radial teeth 32 and an annular recess portion 34. The outer end of collar 22 terminates in an annular end face 36. FIG. 2 shows that each tooth 32 is a rather massive tooth having an angular extent of about 35°, with the spaces or clearances between teeth 32 being denominated by numerals 38. The axial and radial extents of teeth 32 are defined by side surfaces 40, with the tooth outer axial end surfaces being denominated by numeral 42.

Figure 3:
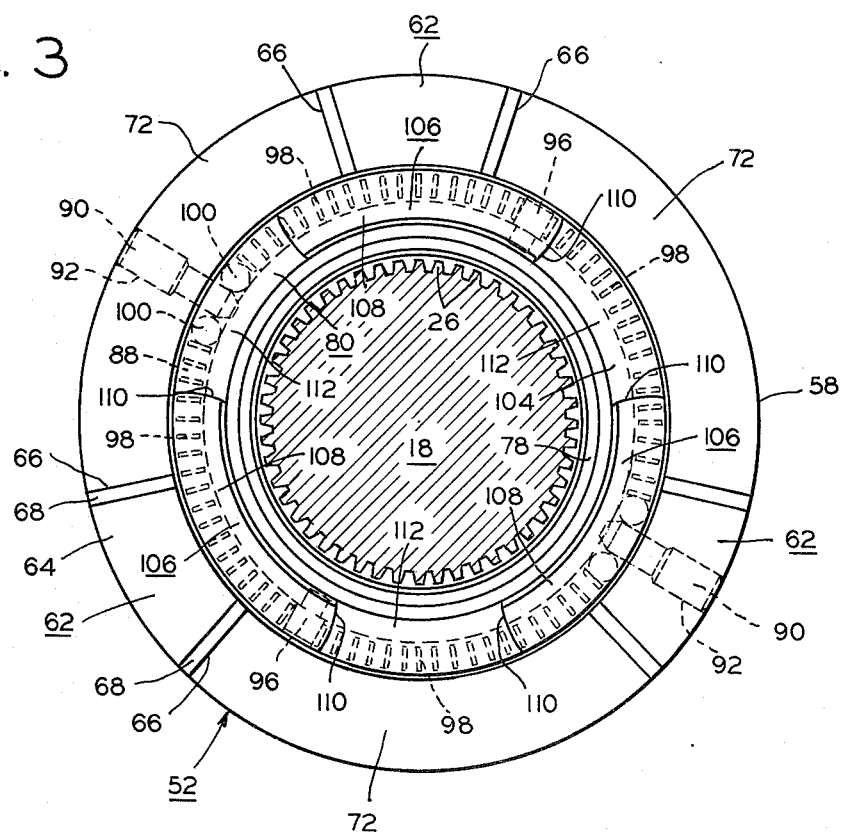
FIG. 3 is a simplified enlarged sectional view taken along line 3—3 of FIG. 1 and shows the drive-half portion of the clutch.

As best seen in FIGS. 1 and 3, clutch 10 also includes a case or driving-side collar 52 that is physically secured for rotation by external splines 54 on differential case outer portion 20. Splines 54 mate with internal splines 56 of collar 52, with the axial extent of splines 56 being limited to the axial extent of that portion of collar 52 that surrounds case outer portion 20.

Driving-side collar 52 has a flat front surface 58 which is provided with a plurality of axially extending radial teeth 62 that are similar in size, location and angular spacing to teeth 32 of collar portion 22. Teeth 62 have outer axial end surfaces 64, with the axial and radial extents of teeth 62 being defined by side surfaces 66. The intersections between tooth outer axial end surfaces 64 and tooth side surface 66 are relieved by chamfer or cam surfaces 68 which may have a 30° angle relative to outer axial end surfaces 64. The angular spaces or clearances between teeth 62 are denominated by numerals 72, with collar 52 also having an annular recess portion 74 radially inwardly from and axially spaced from teeth 62.

A comparison of FIGS. 1, 2 and 3 will show that even though teeth 62 are similar in location and angular spacing to teeth 32, the radial extent or the length of side surfaces 66 of teeth 62 is less than the radial extent or length of side surfaces 40 of teeth 32, the reason for which will become apparent as this description progresses.

Annular recess portion 74 of case-side collar 52 serves to receive a cam ring 80 whose inner annular end surface 82 is closely adjacent to outer annular end surface 84 of differential carrier outer portion 20. Cam ring 80 is also provided with an annular recess portion 86 which is open toward annular recess portion 34 in shaft collar 22, with recess portions 86 and 34 serving to confine the opposite ends of a spring or bias member 78 whose function will be discussed in more detail later.

Cam ring 80 is also provided with a peripheral groove 88 which serves to freely receive the inner ends of a pair of diametrically aligned extended dog point set screws 90 fixedly received in opposed radial bores 92 in case-side collar 52. One function of opposed set screws 90 is to fix the axial location of cam ring 80 while at the same time still permitting rotation of cam ring 80 relative to case-side collar 52. Physically received in cam ring groove 88 and physically attached to cam ring 80 are a pair of diametrically opposed rivet or retainer members 96, with members 96 being spaced 90° from set screws 90 when cam ring 80 is centered relative to collar 52.

In order to permit centering of cam ring 80 relative to collar 52, set screws 90 and retainer members 96 are utilized to divide cam groove 80 into four equal quadrants, with each quadrant being in the form of a 90° arc that contains a bias or spring member 98 preferably in the form of a coil spring. As best seen in FIG. 3, one end of each of the four spring members 98 abuts one of retainer members 96, whereas the other ends of spring members 98 abut spherical members 100 which in turn abut set screws 90. The use of spherical members 100 facilitates the assembly of cam ring 80 into annular recess portion 74 of collar 52 in that the tapered end of dog point set screws 90 will readily spread abutting spherical members 100 when set screws 90 are inserted in radial bores 92. Thus, it is the second function of set screws 90 to serve as indirect abutment points for one end of each of spring members 98.

Cam ring 80 also has a flat front surface 104 and a plurality of equally spaced axially extending radial teeth 106, with the number and location of teeth 106 corresponding with those of teeth 62 of collar 52 when collar 52 and cam ring 80 are centered relative to one another.

Teeth 106 which are located radially inwardly from teeth 62, have a greater angular extent than teeth 62, namely 73° vs. 35°. Collar teeth 106 have outer axial end surfaces 108 and the axial and radial extents of teeth 106 are defined by their side surfaces 110. The angular spaces or clearances between teeth 106 are denominated by numerals 112.

At this time, reference should be had to FIG. 1 and a careful analysis of clutch 10 will show that the axial space, represented by numeral 116, between teeth 32 and 62, or more correctly, the axial space or clearance between outer axial end surfaces 42 and 64 of teeth 32 and 62, respectively, is less than the space or clearance, represented by numeral 120, between the outer axial end surfaces 42 and 108 of teeth 32 and 106, respectively. Therefore, it follows that when teeth 62 and 106 on one side and teeth 32 on the other side are not so angularly aligned as to permit meshing therebetween, then due to the lesser space 116 (with reference to space 120), outer axial end surfaces 42 of teeth 32 and outer axial end surfaces 64 of teeth 62 will abut or contact each other while there is still a slight clearance between outer axial end surfaces 42 of teeth 32 and outer axial end surfaces 108 of teeth 106. The function of these clearances will be made clear as this description progresses.

Prior to discussing the actual intermeshing of teeth 32 with teeth 62 and 106, it should be pointed out that it is the function of spring member 78 to bias collar 22 to the right or disengaging position so there is no intermeshing of the opposing collar and cam ring teeth. As previously noted, collar 22 axially movable and the movement to the left or engaging position is provided via a displacement means 122 which may take any desired form and which for illustrative purposes is shown in the form of a fluid pressure actuator 124 that is commercially manufactured under the name "Roto-Wedge Actuator" by the Heavy Vehicle Systems Group of the Bendix Corporation in Elyria, Ohio. This actuator has its output member 126 pivotally secured to one end of a yoke member 128 that is also pivotally secured on dual hinge members 130, only one of which is shown. Then open ends (only one of which is shown) of yoke member 128 are provided with rotatably mounted followers or rollers 132 that are adapted to contact opposed areas of outer annular end surface 36 of collar 22 and thereafter axially translate collar 22 into its left or engagement position, with the position of roller 132 at the engagement position, being shown in FIG. 1 in phantom lines. If desired, the actuating means shown in previously-referred to co-pending patent application No. 561,520, now U.S. Pat. No. 3,973,450, may also be alternately utilized.

Figure 4:
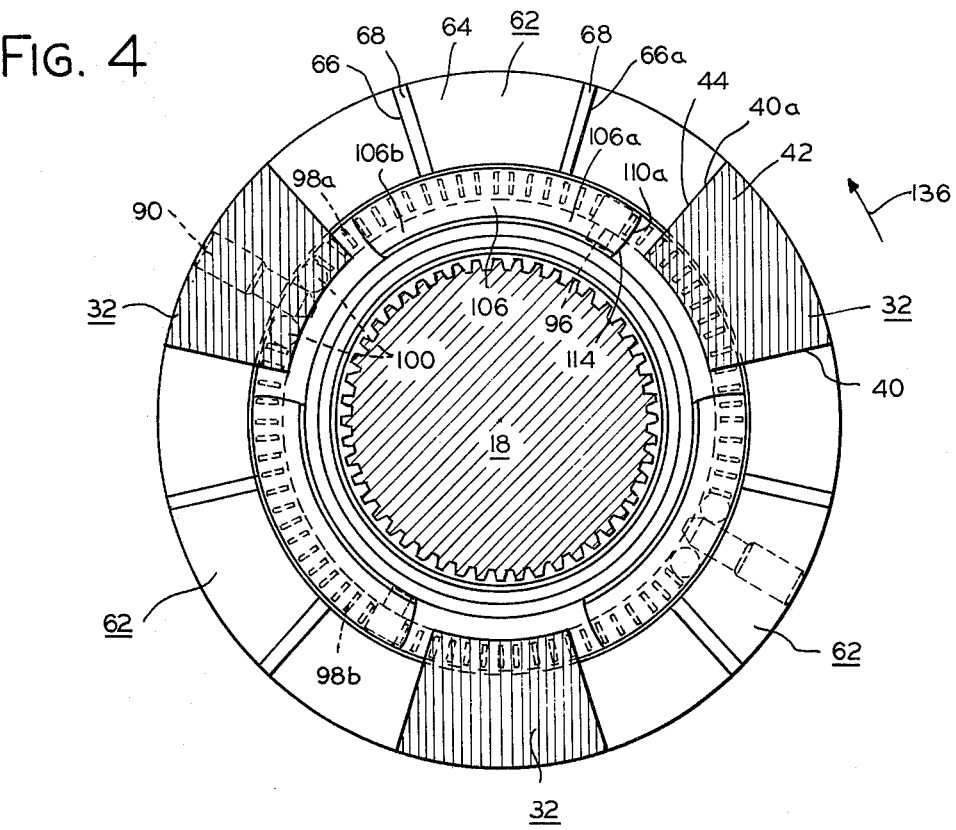
FIG. 4 is a simplified enlarged sectional view taken along line 4—4 of FIG. 1 and shows the complementary tooth portions of the clutch in a centered and meshed but prior-to full torque-transmitting position.
Figure 5:
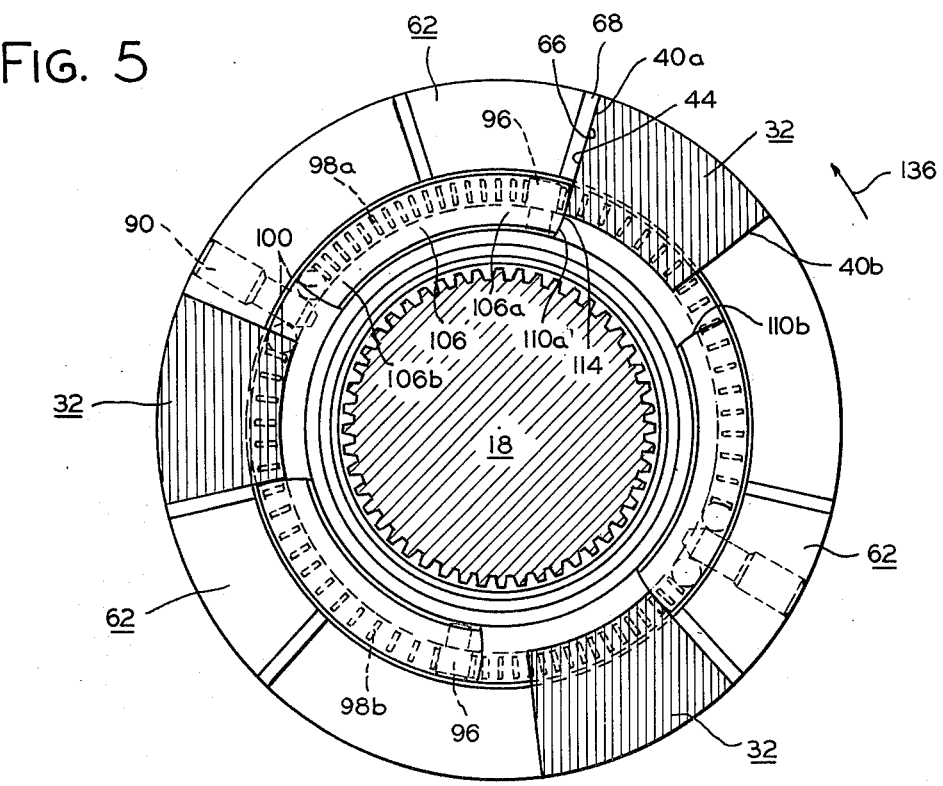
FIG. 5 is a view similar to that of FIG. 4 but shows the clutch teeth in full intermeshing and full torque-transmitting position.

As best seen in FIG. 3, it should be understood that quadrant spring members 98, on conjunction with retainer members 96 and set screws 90, serve to center cam ring teeth 106 with reference to collar teeth 62 in the rest position. FIG. 1, and more specifically FIGS. 4 and 5, show that side surfaces 40 of teeth 32 are designed to intermesh with side surfaces 66 of teeth 62 and at least a portion of side surfaces 110 of teeth 106. FIG. 4 shows the complementary tooth portions of the clutch in a centered and meshed but prior-to full torque-transmitting position, whereas FIG. 5 shows the actual physical abutment of tooth side surfaces 40 with tooth side surfaces 66 and 110.

It should be clear at this time, from a perusal of FIG. 4, that when teeth 32 are centered relative to teeth 106 that teeth 32 can be angularly displaced, preferably for up to 6°, in both directions, from their center positions, before there is abutment between tooth side surfaces 40 and 110. Thus, while there is an up to 6° bidirectional movement from its centered position, there can be an up to 12° unidirectional movement of teeth 32 relative to teeth 106 when one tooth side surface 40a is abutting one tooth side 110a, while the opposite tooth side 40b is spaced from a side 110b of the trailing tooth as is shown in FIG. 5, for example. Similarly, going back to FIG. 4, when teeth 32 are centered relative to teeth 62, teeth 32 can be angularly displaced, preferably for up to 25°, in both directions, from their centered position, before there is abutment between adjacent tooth sides 40 and 66. If teeth 32 are not centered relative to teeth 62, then the range of angular movements between teeth 32 and 62 will vary from 19° to 31°, depending on the location of teeth 32 relative to teeth 106.

FIG. 4 also shows, that in the centered position of teeth 32 relative to teeth 62 and 106, teeth 32 have to travel an initial 6° before there is contact between tooth sides 40 and 110. Thereafter, teeth 32 will angularly displace teeth 106 for about 19°, until adjacent tooth sides 40a and 66a abut, as best seen in FIG. 5. FIG. 5 also shows that since set screws 90 do not rotate while retainer members 96 do rotate with cam ring 80, that, depending on the direction of rotation of teeth 32, it is only the spring members 98 that lead retainer members 96 that are compressed the previously-described 19°, whereas the spring members 98 that trail retainer members 96 actually increase their 90° spring arc by 19°. This can thus be seen by comparing spring members 98a and 98b in FIG. 4, where they are the same length, to the FIG. 5 showing, wherein springs 98a are compressed while springs 98b are relieved.

Displacement means 122 is provided with a fluid pressure inlet port 134, with the fluid pressure, in a known manner, causing its output member 126 to pivot yoke member 128 about hinge members 130 and thereby cause the contacting, by rollers 132, of annular end surface 36 of collar 22. After overcoming the bias of spring member 78, teeth 32 are caused to intermesh with teeth 62 and 106 in the manner about to be described.

Angular spaces 72 between teeth 62 and angular spaces 112 between teeth 106 are more than sufficient to permit the insertion of teeth 32 therein between. Similarly, spaces 38 between teeth 32 of collar 22 are also of sufficient angular extent so as to permit the insertion of teeth 62 of collar 52 and teeth 106 of cam ring 80. As previously noted, and shown in FIG. 4, when teeth 32 are centered relative to teeth 62 and 106, there can still be a 6° bidirectional movement before tooth side surfaces 40 abut the adjacent or complementary sides 110 of adjacent teeth 106.

As shown in FIG. 3, in the normal unengaged position of clutch 10, cam ring 80 is in its centered position so that the centers of cam ring teeth 106 and collar teeth 62 are aligned. In this position, cam ring teeth 106 can be bidirectionally displaced 25° relative to teeth 62 before one of tooth side surfaces 66 is radially or angularly aligned with one of tooth side surfaces 110, as best seen in FIG. 5.

In operation, assuming that meshing occurs in the idealized fashion shown in FIG. 4, teeth 32 will freely enter into spaces 112 between teeth 106 and spaces 72 between teeth 62. Thereafter, assuming rotation of teeth 32 in the direction of arrow 136, in FIGS. 4 and 5, the leading tooth side surfaces 40a will first make contact with trailing tooth side surfaces 110a and thereafter continue to be angularly displaced until leading tooth side surfaces 40a also abut trailing tooth side surfaces 66a, with this final position being shown in FIG. 5. Once tooth side surfaces 40 abut tooth side surfaces 110, cam ring 80 will be angularly displaced from its centered position because the amount of torque being transferred exceeds the spring biasing force exerted by spring members 98. However, it is only after there is contact between tooth side surfaces 40 and 66, as shown in FIG. 5, that full torque transfer takes place.

Since the previously-described idealized meshing sequence occurs rather infrequently, several other meshing possibilities will now be discussed. Let it be assumed that during the longitudinal movement of collar 22 axial end surfaces 42 of teeth 32 abut outer axial end surfaces 108 of teeth 106 in areas 106a of teeth 106 trailing or behind teeth 62 with reference to the counterclockwise direction indicated by arrow 136. At this time it should be remembered that in the disengaged state (FIG. 1) that axial space 116 between teeth 32 and 62 is less than axial space 120 between teeth 32 and 106. Therefore, since the centering force of spring members 98 is less than the rotational friction force due to the application or axial force of displacement means 122, teeth 32 may cause teeth 106 to rotate therewith until tooth side surfaces 40 come into contact with chamfer or cam surfaces 68 of teeth 62. Chamfer 68 will cause a slight camming or axial outward or reverse movement of teeth 32, and consequently of collar 22, after which there is frictional engagement between outer axial end surfaces 42 and 64 of teeth 32 and 62, respectively. This slight outward movement of teeth 32 will disrupt the frictional contact between surfaces 42 and 108 of teeth 32 and 106, respectively, and will permit spring members 98 to again center cam ring teeth 106 with reference to collar teeth 62. After teeth 32 have completely ridden over teeth 62, each tooth surface 42 again makes contact with surface 108 of tooth 106, namely with the portions 106b of teeth 106 that lead or are ahead of teeth 62 when viewed with reference to arrow 136. There could, or course, also have been initial contact between teeth 32 and tooth portions 106b, in which case the following description is also applicable thereto. Teeth 32 will now further displace and/or slide relative to teeth 106, depending on the frictional coefficient between tooth surfaces 42 and 108, as well as the resistance offered by springs 98. As noted, there could be some angular displacement of cam ring teeth 106 if the frictional force between teeth 106 and teeth 32 is greater than the force of springs 98a. If this be the case, the angular displacement of cam ring 80 and its teeth 106 will continue until the force of springs 98a becomes greater than the frictional force between teeth 106 and teeth 32. Thereafter, teeth 32 will frictionally slide relative to teeth 106 until teeth 32 completely clear teeth 106 which in turn will permit the re-centering of cam ring 80 and the entry of teeth 32 into spaces 112 between teeth 106. The subsequent further angular movement of teeth 32 will cause abutment of tooth side surfaces 40 and 110 with the resulting angular displacement of cam ring 80 until there is abutment between tooth side surfaces 40 and 66 in the manner already previously described.

Laboratory tests have shown that occasionally during the meshing of clutch 10 that the corner intersection 44 of tooth surfaces 40 and 42 will on occasion hang-up on the corner intersection 114 of tooth surfaces 108 and 110, i.e., there will be a corner hang-up that will cause the angular displacement of cam ring 80 and its teeth 106 in conjunction with the angular displacement of teeth 32 until side surface 40 of teeth 32 comes into contact with chamfer surfaces 68 of teeth 62, which will cause the previously-described slight axial outward or rightward movement of collar 22 and thereby physically separate the corner hang-up of intersections 44, 114 between teeth 32 and 106 in the manner already previously described and thereby allowing cam ring 80 to center itself again relative to teeth 62. This is an important improvement over the structure of the cited co-pending Application where occasional corner hang-ups can effectively destroy the clutch structure since there is no mechanism for alleviating the corner hang-up problem.

The angular displacement of cam ring 80 with reference to collar 52 permits engagement between collars 22 and 52 under dynamic conditions, with engagement between the teeth of collars 22 and 52 being possible up to a predetermined different rotational speed between the axle shaft and the differential case.

It should, of course, be understood that, if desired, dynamic tooth clutches, such as clutch 10, could be designed that utilize differing numbers of teeth, depending on the desired operational characteristics. In addition, it should be understood, that while collars 22 and 52 are denominated as driven and driving collars, respectively, their positions and/or function could be reversed. The previously described construction not only solves the prior art closes hang-up problem, but also permits an up to 31° range of angular movement between the teeth of the opposing collars as well as an up to 19° displacement of the cam ring relative to its associated collar. Furthermore, the structure is much more rigid, has fewer teeth and is less expensive to manufacture as well as easier to maintain.

If so desired, the fluidic circuit and control means set forth in FIG. 7 of co-pending patent application Ser. No. 561,520 can also be utilized for the operation of displacement means 122.

Obviously, while the invention has been described in relation to only one embodiment, numerous variations, changes and substitutions of equivalents will present themselves to persons skilled in the art and may be made without necessarily departing from the scope and principles of this invention. As a result, the embodiment described herein is subject to various modifications, changes and the like, without departing from the scope and spirit of the invention, with the scope thereof being determined solely by reference to the claims appended hereto.

What I claim is:

1. An improved dynamic tooth clutch comprising:
    a. a pair of opposed annular members each of which has a series of equally angularly spaced axially extending teeth thereon, the teeth of said members being adapted to intermesh with clearance, so that when said teeth are in mesh, limited relative rotation can take place between said members, with the radial extent of the teeth of one of said members being greater than that of the teeth of the other of said members;
    b. a cam ring concentric with said other member;
    c. complementary retaining and control means on said cam ring and said other member such that said cam ring can rotate relative to said other member by a predetermined angular amount in either direction from a position in which it is centered relative to said other member, said control means also including yieldable means for biasing said cam ring toward its centered position;
    d. a series of axially extending teeth on said cam ring adapted to intermesh with clearance with said teeth of said one member, so that when said teeth of said one member are in mesh with said teeth of said cam ring, limited relative rotation can take place between said one member and said cam ring, with the axial clearance between the outer axial end faces of the teeth of said annular members being less than the axial clearance between the outer axial end faces of the teeth of said one member and the outer axial end faces of the teeth of said cam ring, so that the tooth axial end faces of said annular members can axially abut whilst there is still axial clearance between the tooth axial end faces of said one member and the tooth axial end faces of said cam ring; and
    e. means for effecting relative axial displacement between said one member on the one hand and said other member and said cam ring on the other hand to effect meshing engagement between the teeth of said annular members and between the teeth of said one member and the teeth of said cam ring.

2. The improved dynamic tooth clutch of claim 1 wherein said one annular member takes the form of a first collar axially slidable and rotatable with a first rotatable member and said other annular member takes the form of a second collar mounted on and rotatable with a second rotatable member.

3. The improved dynamic tooth clutch of claim 2 wherein said first and second rotatable members are an axle shaft and the differential case respectively of a differential mechanism comprising a differential carrier having an input shaft with a bevel pinion thereon, a bevel ring gear attached to said differential case and in mesh with said bevel pinion, said differential case being rotated by said bevel ring gear, axle shafts received within said differential case and having first bevel gears thereon, a cross within said differential case, and second bevel gears mounted on said cross and in mesh with said first bevel gears for imparting differential drive to said axle shafts.

4. The improved dynamic tooth clutch of claim 2 wherein said cam ring is mounted concentrically within said second collar.

5. The improved dynamic tooth clutch of claim 4 wherein said cam ring is confined between an annular end surface of said differential case and an inner peripheral surface of said second collar, with said cam ring and said first collar being provided with facing annular recess portions, said recess portions serving to confine the opposite ends of a bias member for biasing said first and second collars out of engagement with each other.

6. The improved dynamic tooth clutch of claim 4 wherein said complementary retaining and control means comprises a peripheral groove on said cam ring, a plurality of set screws and a plurality of retainer members, with a portion of said set screws being fixedly received in radial bores in said second collar and said retainer members are physically received in said cam groove and attached to said cam ring, said retainer members and set screws being alternately and equally spaced when said cam ring is centered relative to said second collar, said groove serving to freely receive the inner ends of said set screws so as to fix the axial location of said cam ring while at the same time still permitting a predetermined amount of angular rotation of said cam ring relative to said second collar.

7. The improved dynamic tooth clutch of claim 6 wherein said yieldable means comprises a plurality of spring members received in said cam ring peripheral groove, said spring members being received between said set screws and said retainer members, with rotation of said cam ring causing compression of those spring members that lead said retainer members thereby limiting the amount of said angular rotation of said cam ring relative to said second collar.

8. The improved dynamic tooth clutch of claim 7 wherein said amount of angular rotation of said cam ring is up to 19° in either direction.

9. The improved dynamic tooth clutch of claim 1 wherein the teeth of said annular members intermesh with a clearance such that from a centered position of said annular members, said limited relative rotation is limited to substantially 25° in either direction.

10. The improved dynamic tooth clutch of claim 9 wherein the teeth of said annular members intermesh with a clearance such that from a noncentered position of said annular members, said limited relative rotation can range from 19° to 31° in either direction.

11. The improved dymamic tooth clutch of claim 1 wherein the teeth of said one member and said cam ring teeth intermesh with a clearance such that from a centered position of said cam ring relative to said one member, said limited relative rotation is limited to substantially 6° in either direction.

12. The improved dynamic tooth cluth of claim 1 wherein the teeth of said one member and said cam ring teeth intermesh with a clearance such that from a noncentered position of said cam ring relative to said one member, said limited relative rotation can range from 0° to 12°.

13. The improved dynamic tooth clutch of claim 1 wherein the angular extent of said cam ring teeth is greater than the angular extent of the teeth of said other member.

14. The improved dynamic tooth clutch of claim 13 wherein the intersections between the tooth outer axial end surfaces and the tooth side surfaces of the teeth of said other member are relieved by chamfer surfaces having an acute angle relative to said tooth outer axial end surfaces, said chamfer surfaces causing a slight axial outward movement of the teeth of said one member upon the abutment of the teeth of said members when the teeth of said one member are also in axial outer end abutment with said cam ring teeth thereby disrupting the axial outer end abutment between said cam ring and the teeth of said one member so as to permit said complementary retaining and control means to again center said cam ring with reference to said other member.

15. The improved dynamic tooth clutch of claim 2 wherein said means for effecting relative axial displacement comprises a fluid pressure actuator having an output member pivotally secured to one end of a yoke member that is also pivotally secured on a hinge member, said yoke member having open ends that are provided with rotatably mounted followers adapted to contact an outer annular end surface of said first collar for axially translating said first collar into engagement with said second collar.

16. The improved dynamic tooth clutch of claim 2 wherein said first rotatable member operates at a first speed and said second rotatable member operates at a second speed, with the angular displacement of said cam ring permitting complete axial engagement of said axially extending teeth of said annular members before abutment of the adjacent side surfaces of said axially extending teeth.

17. A dynamic tooth clutch interposed between a rotatable first member operating at a first speed and a rotatable second member operating at a second speed, said clutch comprising:
  a. a first collar slidably mounted on one of said members, said first collar having, on one end, a plurality of equally angularly spaced axially extending radial first teeth;
  b. a second collar fixed to the other of said members, said second collar having, on one end facing said first collar one end, a plurality of equally angularly spaced axially extending radial second teeth substantially similar in location and angular spacing to said first teeth, said first and second teeth being adapted to intermesh and being so angularly spaced that, upon initial intermeshing, when said first teeth are centered relative to said second teeth, there can be a first predetermined amount of bidirectional angular rotational movement therebetween before either of the side surfaces of one of said first or second teeth abuts the adjacent side surfaces of the other of said first or second teeth, with the radial extent of one of said first and second pluralities of teeth being greater than that of the teeth of the other of said pluralities of teeth;
  c. a cam ring concentric with said second collar;
  d. complementary retaining and control means on said cam ring and said second collar permitting a second predetermined amount of bidirectional angular rotational movement of said cam ring relative to said second collar when said cam ring is centered relative to said second collar, said control means also including preloaded and selfcentering yieldable means for centering said cam ring relative to said second collar and returning said cam ring to a center position, relative to said second collar, when said first and second teeth are disengaged;
  e. a plurality of equally spaced axially extending teeth on said cam ring, said cam ring teeth having a greater angular extent than either said first or second teeth, with the centerlines of said cam ring teeth being angularly aligned with the centerlines of said second teeth when said cam ring is centered relative to said second collar, said cam ring teeth being adapted to intermesh with said first teeth and being so angularly spaced that upon intial intermeshing, when said first teeth are centered relative to said cam ring teeth, there can be a third predetermined amount of bidirectional angular rotational movement therebetween before either of the side surfaces of one of said first teeth or cam ring teeth abut the adjacent side surfaces of the other of said first teeth or cam ring teeth;

f. the axial clearance between the outer axial end faces of said first and second teeth is less than the axial clearance between the outer axial end faces of said first teeth and said cam ring teeth, so that, the outer axial end faces of said first and second teeth can axially but whilst there is still axial clearance between the outer axial end faces of said first teeth and said cam ring teeth;

g. each of said second teeth being provided with cam surfaces at the intersections between its outer axial end face and its tooth side faces, to that if the outer axial faces of said first teeth and said cam ring teeth abut, at a location angularly spaced from the end faces of said second teeth, upon the abutment of the adjacent side faces of said first and second teeth, said cam surfaces cause a slight axial outward movement of said first teeth thereby disrupting the axial outer end face abutment between said first teeth and said cam ring teeth so as to permit said yieldable means to again center said cam ring relative to said second collar;

h. means for axially displacing said first collar relative to said second collar, with said second predetermined amount of bidirectional movement allowing full axial intermeshing of said first and second teeth before there is abutment and subsequent torque transfer between either of the side surfaces of one of said first or second teeth with the adjacent side surfaces of the other of said first or second teeth.

18. The dynamic tooth clutch of claim 17 wherein said first predetermined amount of bidirectional angular movement is about 25°.

19. The dymamic tooth clutch of claim 17 wherein said second predetermined amount of bidirectional angular movement is about 19°.

20. The dynamic tooth clutch of claim 17 wherein said third predetermined amount of bidirectional angular movement is about 6°.

21. The dynamic tooth clutch of claim 17 wherein said cam ring is mounted concentrically within said second collar and said cam ring and said first collar are provided with facing annular recess portions, with said recess portions serving to confine the opposite ends of a bias member for biasing said first and second collars out of engagement with each other.

* * * * *